United States Patent [19]

Komatsu

[11] Patent Number: 5,127,704
[45] Date of Patent: Jul. 7, 1992

[54] AUTOMOBILE LOWER BODY STRUCTURE

[75] Inventor: Nobuhiro Komatsu, Yokohama, Japan

[73] Assignee: Mazda Motor Corporation, Japan

[21] Appl. No.: 665,229

[22] Filed: Mar. 6, 1991

[30] Foreign Application Priority Data

Mar. 30, 1990 [JP] Japan .................. 2-32682[U]
Nov. 2, 1990 [JP] Japan .................. 2-115703[U]

[51] Int. Cl.⁵ .................................. B60R 27/00
[52] U.S. Cl. ........................... 296/204; 296/194
[58] Field of Search ......... 296/204, 194, 186, 188, 296/203, 30

[56] References Cited

U.S. PATENT DOCUMENTS

| | | | |
|---|---|---|---|
| 4,450,926 | 5/1984 | Suzuki | 296/204 X |
| 4,457,555 | 7/1984 | Draper | 296/186 |
| 4,514,008 | 4/1985 | Watanabe et al. | 296/204 |
| 4,516,803 | 5/1985 | Kaltz et al. | 295/194 X |
| 4,729,156 | 3/1988 | Norris et al. | 296/204 X |
| 4,840,424 | 6/1989 | Asoh | 296/204 |
| 4,892,350 | 1/1990 | Kijima | 296/204 |

FOREIGN PATENT DOCUMENTS

| | | | |
|---|---|---|---|
| 3035644 | 5/1982 | Fed. Rep. of Germany | 296/204 |
| 205277 | 12/1982 | Japan | 296/204 |
| 126263 | 7/1983 | Japan | 296/204 |
| 64-24684 | 2/1989 | Japan . | |

Primary Examiner—Margaret A. Focarino
Assistant Examiner—Gary C. Hoge

[57] ABSTRACT

An automobile lower body structure includes a floor panel having a tunnel structure extending longitudinally of a vehicle body at a location substantially centrally thereof, a dashboard lower panel secured to the front end of the floor panel, and a dashboard lower cross member extending transversely of the vehicle body and secured to the lower surface of the dashboard lower panel. The dashboard lower cross member has opposite ends secured to respective of two front side frames extending longitudinally of the vehicle body at opposite sides thereof, and a rearwardly extending intermediate portion partitioning the inside of the tunnel structure so that a closed cross section is formed at an upper portion within the tunnel structure.

10 Claims, 6 Drawing Sheets

AUTOMOBILE LOWER BODY STRUCTURE

BACKGROUND OF THE INVENTION

1. Field of the Invention

The present invention relates generally to an automobile body structure, and more particularly, to an automobile lower body structure for providing a vehicle body with satisfactory rigidity.

2. Description of the Prior Art

Japanese Utility Model Laid-open Application (unexamined) No. 64-24684 discloses a floor structure in the proximity of a front portion of a passenger compartment. In this floor structure, a front wall and a floor of the passenger compartment are formed by a dashboard lower panel and a floor panel, respectively. The dashboard lower panel is comprised of a vertical partition wall for partitioning the passenger compartment from an engine compartment located frontwardly of the vehicle body and an inclined portion extending rearwardly downwardly from the vertical partition wall. The floor panel is comprised of an upwardly protruding tunnel structure extending longitudinally of the vehicle body and an inclined portion extending frontwardly upwardly from a floor portion. A dashboard lower cross member extending transversely of the vehicle body is secured to the lower surface of the inclined portion to form a reinforcement having a closed cross section, whereas a floor reinforcement extending transversely of the vehicle body is secured to the upper surface of the inclined portion. Furthermore, a dashboard lower reinforcement is secured to the vertical partition wall and the tunnel structure along corner therebetween, and opposite ends of the dashboard lower reinforcement are securely connected to respective of two front frames extending longitudinally of the vehicle body on the lower surface of the floor panel.

However, the above-described conventional floor structure needs a plurality of reinforcements for raising the rigidity thereof at a joining area between the vertical partition wall and the tunnel structure, and a the inclined portion between the vertical partition wall and the floor portion, thus requiring a substantial amount of time for manufacturing the floor structure.

Furthermore, since the tunnel structure is formed by bending the floor panel, the tunnel structure cannot satisfactorily absorb a front-end impact produced, for example, by a head-on collision. Accordingly, this kind of impact load must be absorbed only by front frames extending longitudinally of the vehicle body on both sides thereof. As a result, the problem arises that the front frames must be excessively rigidified or the rigidity must be ensured by enlarging the size of the tunnel structure.

SUMMARY OF THE INVENTION

The present invention has been developed to overcome the above-described disadvantages.

It is accordingly an object of the present invention to provide an automobile lower body structure which can provide satisfactory rigidity for a vehicle body in the proximity of a dashboard lower panel and which can satisfactorily absorb a front-end impact by a tunnel structure formed therein.

Another object of the present invention is to provide an automobile lower body structure of the above-described type which is simple in construction and can be readily manufactured at a low cost.

In accomplishing these and other objects, an automobile lower body structure according to the present invention includes a floor panel having a tunnel structure extending longitudinally of a vehicle body at a location substantially centrally thereof, a dashboard lower panel secured to a front end of the floor panel, and a dashboard lower cross member extending transversely of the vehicle body and secured to a lower surface of the dashboard lower panel. The dashboard lower cross member has opposite ends secured to respective of two front side frames extending longitudinally of the vehicle body at opposite sides thereof, and a rearwardly extending intermediate portion for partitioning the inside of the tunnel structure so that a closed cross section may be formed at an upper portion within the tunnel structure.

The provision of the above-described dashboard lower cross member increases rigidity in the proximity of the dashboard lower panel and reduces the number of parts, thus providing effective reinforcement.

In addition, the formation of a closed cross section at an upper portion within the tunnel structure rigidifies the tunnel structure and can absorb a front-end impact, thus reducing an impact load to be absorbed by the front side frames.

BRIEF DESCRIPTION OF THE DRAWINGS

These and other objects and features of the present invention will become more apparent from the following description of preferred embodiment thereof with reference to the accompanying drawings, throughout which like parts are designated by like reference numerals, and wherein.

DETAILED DESCRIPTION OF THE PREFERRED EMBODIMENTS

Figure 1:
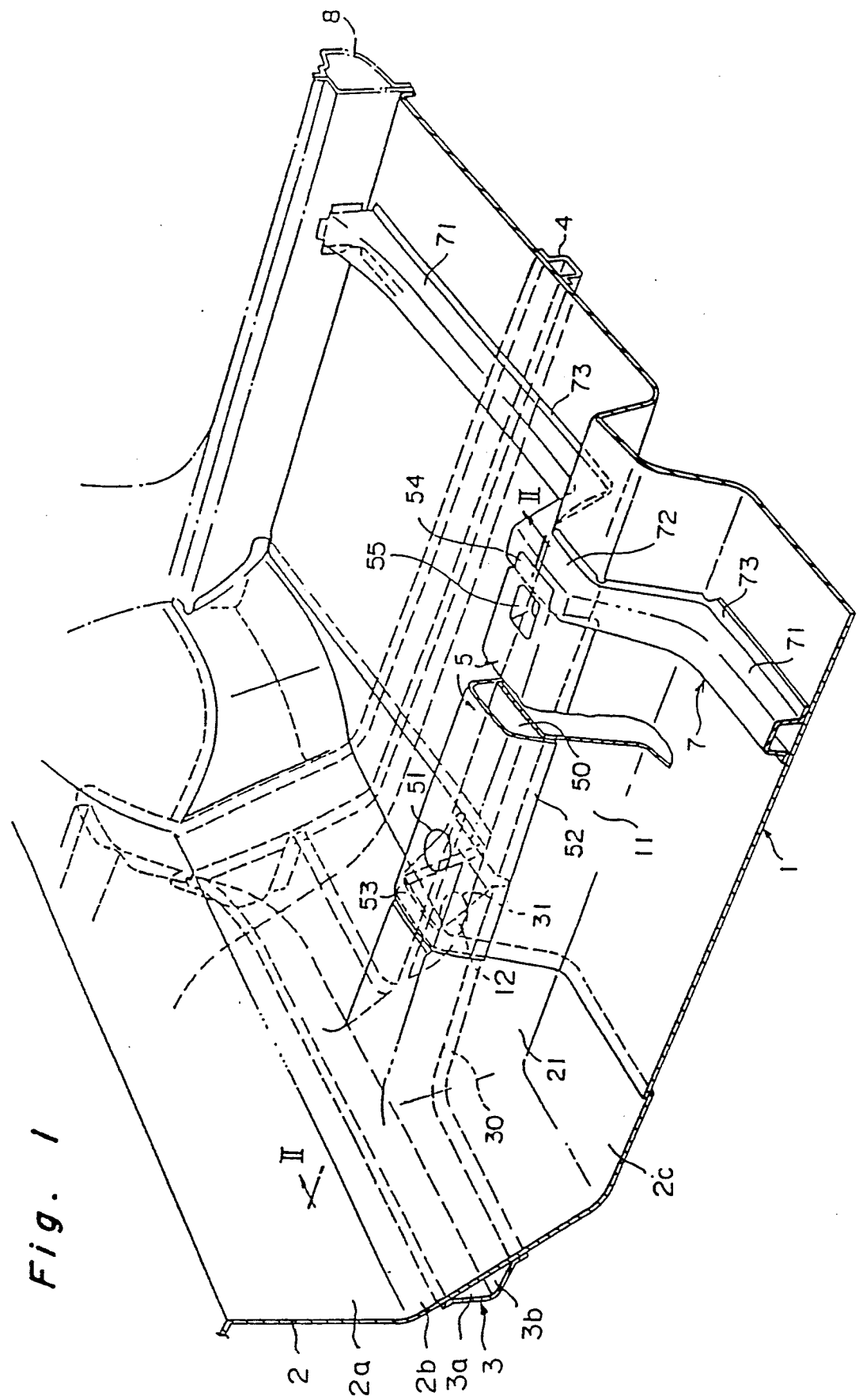
FIG. 1 is a fragmentary perspective view of a front portion of an automobile lower body structure according to a first embodiment of the present invention.
Figure 2:
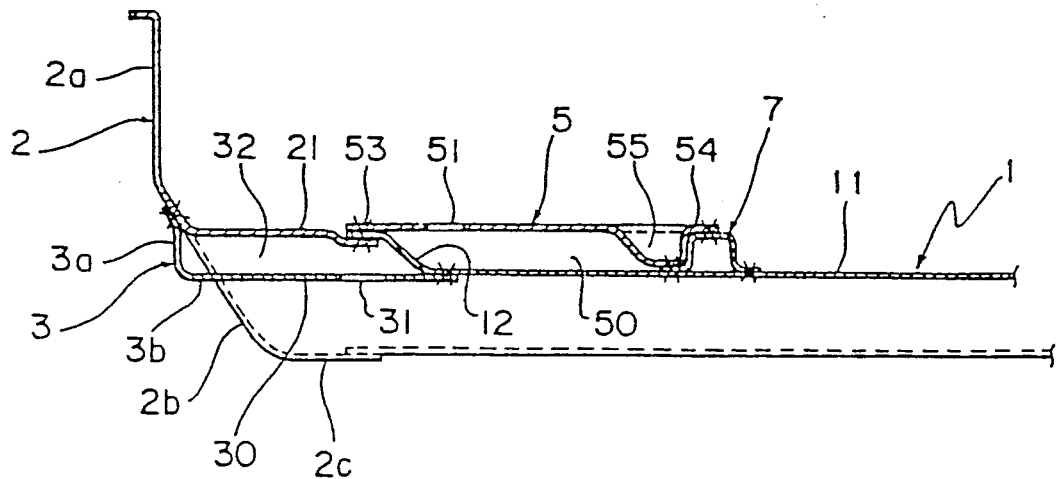
FIG. 2 is a sectional view taken along line II—II in FIG. 1.

Referring now to the drawings, FIGS. 1 and 2 depict an automobile lower body structure according to a first embodiment of the present invention, which includes a floor panel 1 having a tunnel structure 11 extending longitudinally of a vehicle body substantially at the center thereof. The tunnel structure 11 has a U-shaped cross section, which is preferably oriented with its open end downward.

Below a dashboard (not shown) is formed a lower panel 2 (hereinafter referred to as a dashboard lower panel) comprised of a vertical partition wall 2a, an inclined portion 2b extending rearwardly downwardly from the vertical partition wall 2a, and a floor portion 2c extending horizontally rearwardly from the inclined portion 2b. The dashboard lower panel 2 has a tunnel portion 21 extending rearwardly from the inclined portion 2b substantially at the center of the inclined portion 2b and the floor portion 2c. The tunnel portion 21 of the dashboard lower panel 2 is higher than the tunnel structure 11 of the floor panel 1 and is rigidly secured to the front end of the tunnel structure 11.

Figure 3:
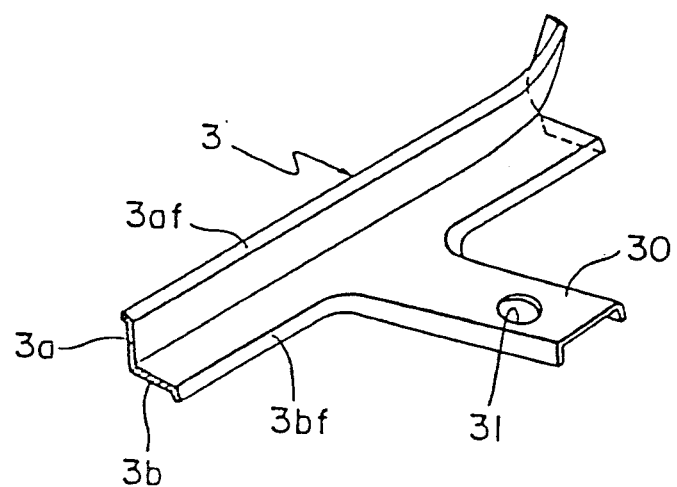
FIG. 3 is a perspective view of a dashboard lower cross member mounted in the structure of FIG. 1.

FIG. 3 depicts a transversely extending lower cross member 3 (hereinafter referred to as a dashboard lower cross member) comprises of a vertical plate 3a and a horizontal plate 3b, both of which are integrally formed with or otherwise secured to each other substantially in the form of an "L". The vertical plate 3a and the horizontal plate 3b have respective flanges 3af and 3bf secured to the lower surface of the inclined portion 2b of the dashboard lower panel 2. Opposite ends of the dashboard lower cross member 3 are secured to front side frames 4 extending longitudinally of the vehicle body on the lower surface of the floor panel 1.

The dashboard lower cross member 3 has a partition wall 30 extending rearwardly from the horizontal plate 3b substantially at the center thereof along interior of the tunnel portion 21 of the dashboard lower panel 2 at a position below an upper wall thereof. The partition wall 30 extends rearwardly beyond the rear end of the tunnel portion 21 and is inserted into the tunnel portion 21 so as to horizontally partition the inside of the tunnel portion 21, thereby forming a closed cross section 32 at an upper portion within the tunnel portion 21.

An upper wall of the tunnel structure 11 of the floor panel 1 is on the same level as the partition wall 30 of the dashboard lower cross member 3.

The front end of the floor panel 1 is connected to the rear end of the floor portion 2c of the dashboard lower panel 2. Opposed side walls of the tunnel structure 11 of the floor panel 1 are connected to those of the tunnel portion 21 of the dashboard lower panel 2. The front end of the upper wall of the tunnel structure 11 is connected to the rear end of the partition wall 30 of the dashboard lower cross member 3.

Opposite side edges of the front upper wall of the tunnel structure 11 are split and the front upper wall is raised to form a bracket 12. The upper end of the bracket 12 is connected to the rear end of the upper wall of the tunnel portion 21 of the dashboard lower panel 2 whereas the lower end of the bracket 12 is connected to the rear end of the partition wall 30 of the dashboard lower cross member 3.

This construction rigidifies the dashboard lower cross member 3, and also the formation of the closed cross section 32 within the tunnel portion 21 rigidifies the tunnel structure 11. As a result, when an automotive vehicle meets with a head-on collision, the tunnel structure 11 can absorb an impact load produced by the collision, thereby reducing the load to be absorbed by the front side frames 4.

Figure 4:
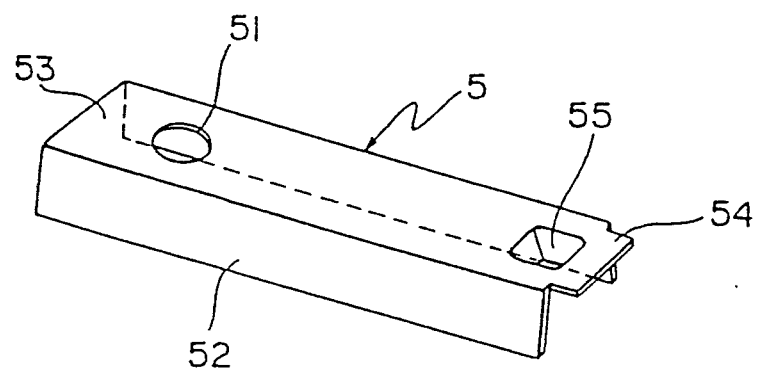
FIG. 4 is a perspective view of a tunnel reinforcement mounted in the structure of FIG. 1.

FIG. 4 depicts a tunnel reinforcement 5 having a U-shaped cross section, which is preferably oriented with its open end downward. The front end of an upper wall 53 of the tunnel reinforcement 5 is secured to the rear end of the upper wall of the tunnel portion 21 whereas lower edges of opposed side walls 52 are secured to opposed upper side portions of the tunnel structure 11 so that a closed cross section 50 is formed above the tunnel structure 11.

The tunnel reinforcement 5 has a flange 54 extending rearwardly from the rear end of the upper wall 53 thereof. This flange 54 is secured to a medial cross member 7 extending transversely of the vehicle body on the upper surface of the floor panel 1.

This construction further rigidifies the tunnel structure 11 and can enhance the ability to absorb the load produced by a collision.

Figure 5:
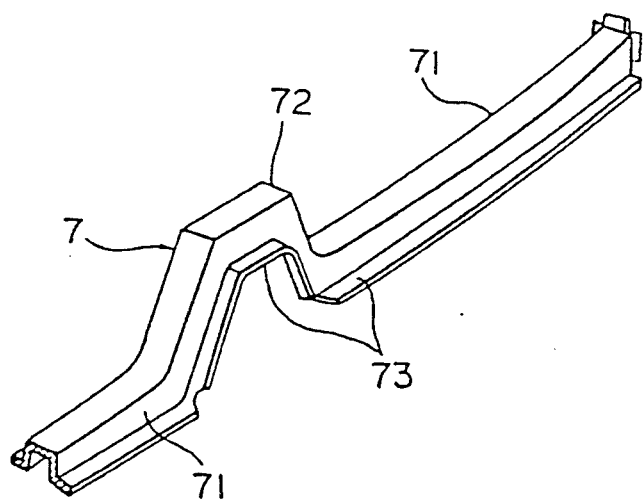
FIG. 5 is a perspective view of a medial cross member mounted in the structure of FIG. 1.

As shown in FIG. 5, the medial cross member 7 has a cross section generally similar to the shape of an inverted "U" and is comprised of two horizontal portions 71 extending horizontally on the floor panel 1 and a bridging portion 72 rising inwardly from the horizontal portions 71 to bridge the tunnel structure 11. The medial cross member 7 has frontwardly and rearwardly extending flanges 73 rigidly secured to the floor panel 1 and has opposite ends rigidly secured to inwardly facing surfaces of side sills 8 extending longitudinally of the vehicle body on both sides thereof.

The flange 54 formed at the rear end of the upper wall 53 of the tunnel reinforcement 5 is secured to the upper surface of the bridging portion 72 of the medial cross member 7. A rectangular depression 55 is formed at a rear portion of the tunnel reinforcement 5, and a bottom surface of depression 55 is secured to the frontwardly extending flange 73 of the bridging portion 72 of the medial cross member 7.

The partition wall 30 of the dashboard lower cross member 3 is provided with a circular opening 31, through which welding instruments can be inserted when the rear end of the upper wall of the tunnel portion 21 and the front end of the bracket 12 are joined to each other, for example, by spot-welding. The tunnel reinforcement 5 is provided with a circular opening 51 formed at a front portion of an upper wall thereof, through which welding instruments can be inserted when the rear end of the partition wall 30 and the rear lower end of the bracket 12 are joined to each other, for example, by spot-welding.

FIGS. 6 to 11 depict an automobile lower body structure according to a second embodiment of the present invention.

Figure 6:
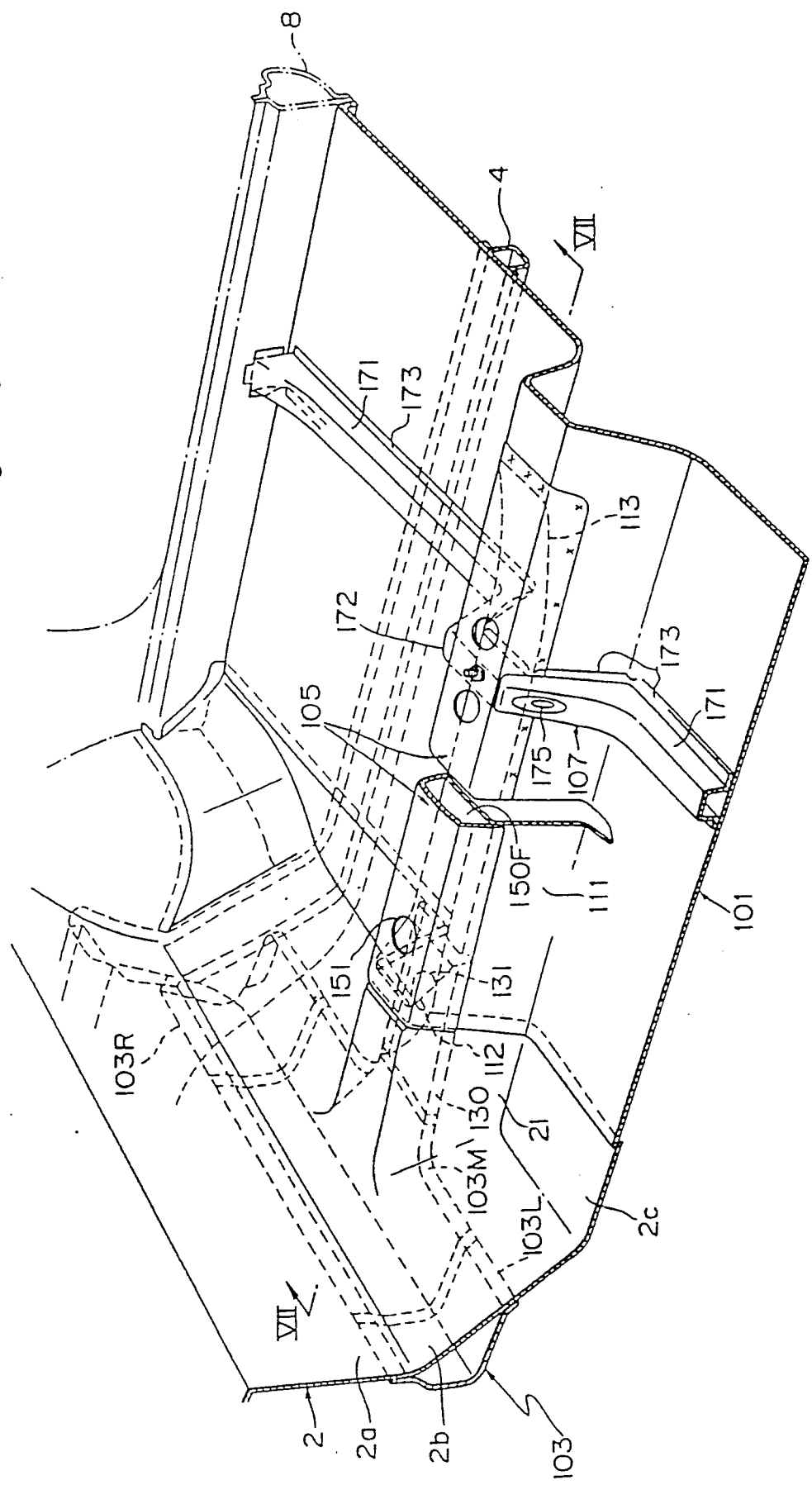
FIG. 6 is a view similar to FIG. 1, according to a second embodiment of the present invention.
Figure 7:
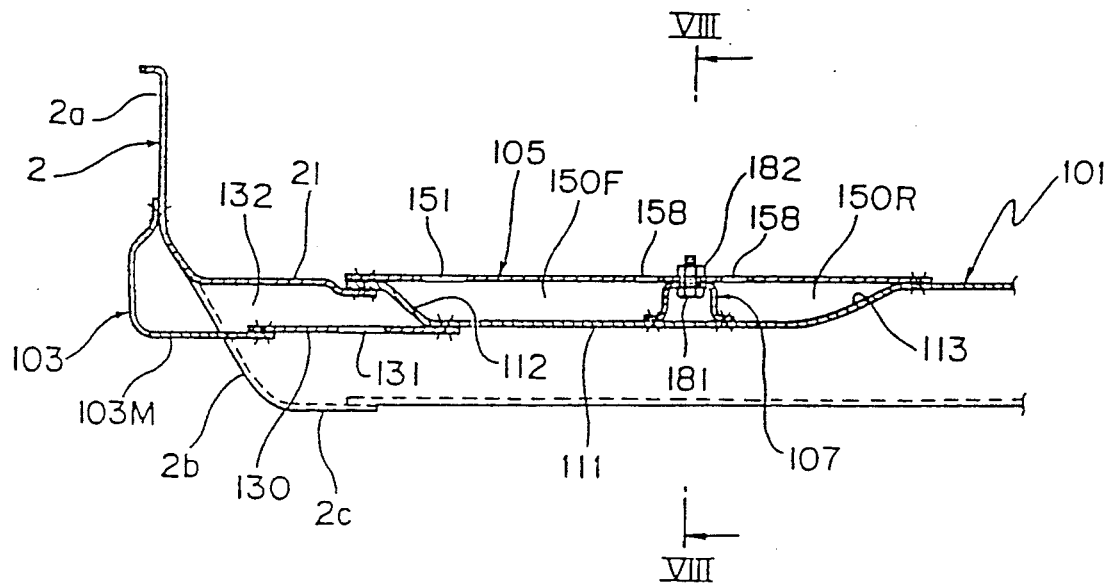
FIG. 7 is a sectional view taken along line VII—VII in FIG. 6.
Figure 9:
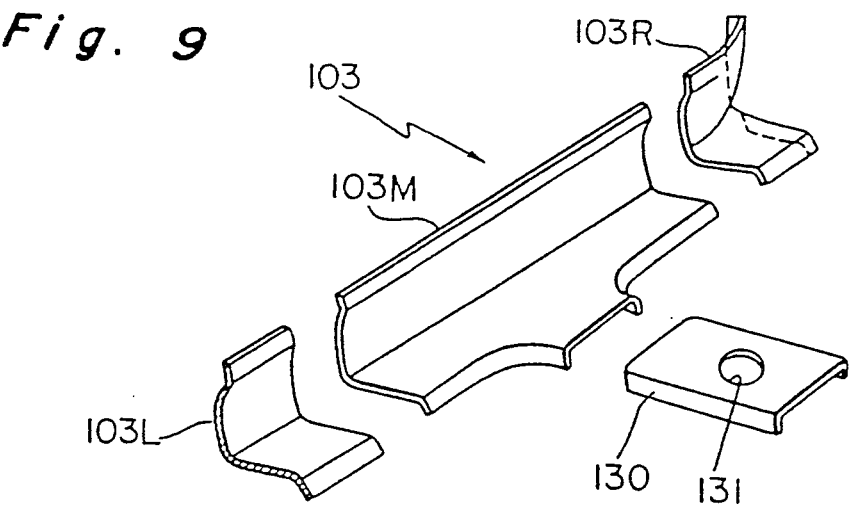
FIG. 9 is an exploded perspective view of a dashboard lower cross member mounted in the structure of FIG. 6.

As shown in FIG. 9, a dashboard lower cross member 103 is comprised of four separate members, a central member 103M, left and right side members 103L and 103R, and a partition wall 130. The left and right side members 103L and 103R are joined to opposite side edges of the central member 103M, whereas the partition wall 130 is joined to the rear end of the central member 103M substantially at the center thereof in a direction transversely of the vehicle body, so that these members 103M, 103L, 103R and 130 form a single cross member generally similar in configuration to the dashboard lower cross member 3 according to the first embodiment of the present invention. After these members 103M, 103L, 103R and 130 have been joined to one another to form a dashboard lower cross member 103, this cross member 103 is secured to the lower surface of the inclined portion 2b of the dashboard lower panel 2 and to the inwardly facing surfaces of both the side frames 4, as shown in FIGS. 6 and 7.

The divided construction of the dashboard lower cross member 103 can simplify operations in manufacturing dashboard lower cross members.

Similar to the first embodiment, the upper end of a bracket 112 formed at a front portion of a tunnel structure 111 is secured to the rear end of an upper wall of a tunnel portion 21 of a dashboard lower panel 2, whereas the lower end of the bracket 112 is secured to the rear end of the partition wall 130 and opposed side walls of the tunnel structure 111 are secured to those of the tunnel portion 21. In this way, a closed cross section 132 is formed at an upper portion within the tunnel portion 21.

The partition wall 130 is provided with a circular opening 131, through which welding instruments can be inserted at the time of spot-welding of the rear upper end of the tunnel portion 21.

The tunnel structure 111 according to this embodiment rises rearwardly diagonally upwardly to the same level as the tunnel portion 21 at a location rearwardly of a medial cross member 107.

A tunnel reinforcement 105 extending along and above the tunnel structure 111 is disposed between the upper end of bracket 112 formed at a front portion of the tunnel structure 111 and the upper end of a rising portion 113 formed rearwardly of the medial cross member 107.

Figure 10:
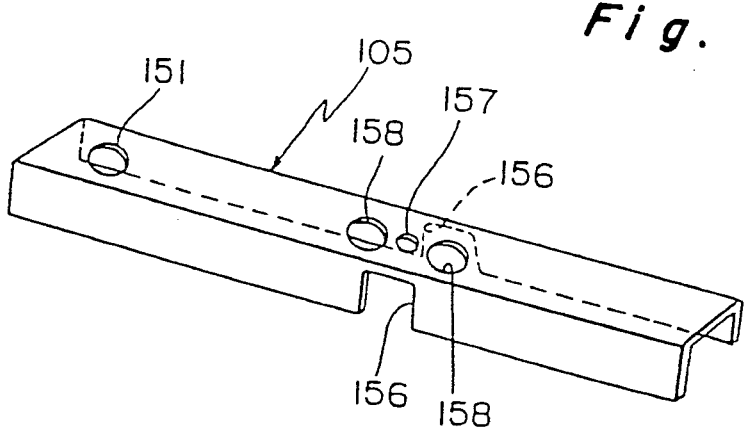
FIG. 10 is a perspective view of a tunnel reinforcement mounted in the structure of FIG. 6.

As similar to the tunnel reinforcement 5 of FIG. 4, the tunnel reinforcement 105 has a cross section generally similar to the shape of an inverted "U", as best shown in FIG. 10. The tunnel reinforcement 105 is provided with two recesses 156 formed in opposed side walls thereof, through which a bridging portion 172 of the medial cross member 107 extends transversely of the vehicle body. The tunnel reinforcement 105 is further provided with a circular opening 151 formed at a front portion thereof, through which welding instruments can be inserted from above at the time of spot-welding of the lower end of the bracket 112.

Figure 11:
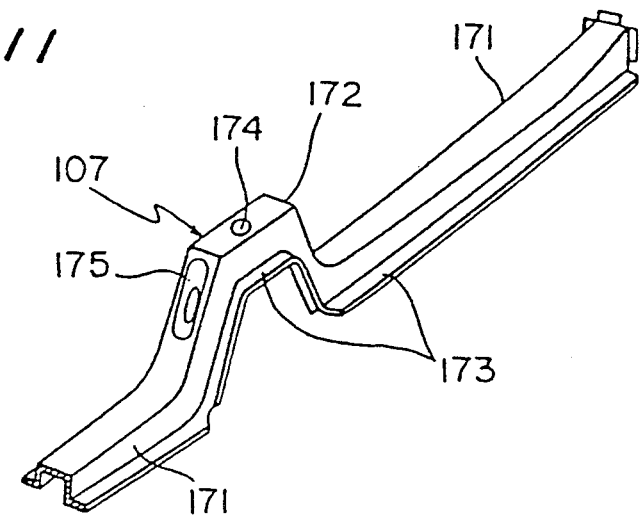
FIG. 11 is a perspective view of a medial cross member mounted in the structure of FIG. 6.

As shown in FIG. 11, the medial cross member 107 is comprised of two horizontal portions 171 and bridging portion 172 rising inwardly from the horizontal portions 171. The medial cross member 107 has frontwardly and rearwardly extending flanges 173 secured to a floor panel 101 and the tunnel structure 11 forming part of the floor panel 101. Opposite ends of the medial cross member 107 are secured to inwardly facing surfaces of opposite side sills 8.

Figure 8:
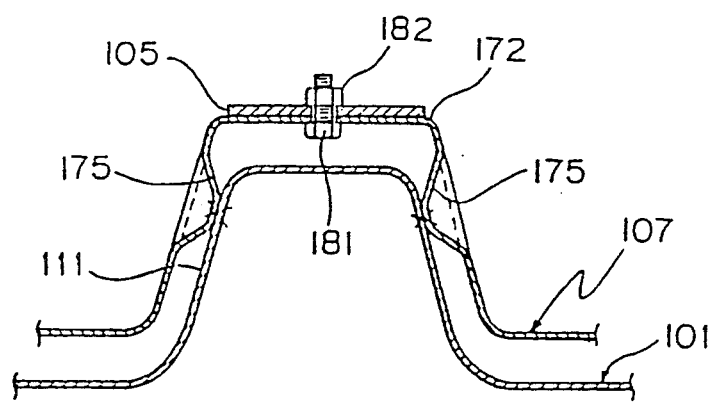
FIG. 8 is a sectional view taken along line VIII—VIII in FIG. 7.

As clearly shown in FIG. 8, opposed inclined portions of the bridging portion 172 are provided with respective recesses 175, the bottoms of which are in abutment with respective opposed side walls of the tunnel structure 111 and are secured thereto.

The bridging portion 172 of the medial cross member 107 is provided with a bolt hole 174, as shown in FIG. 11, whereas the tunnel reinforcement 105 is provided with a bolt hole 157, a shown in FIG. 10, at a location corresponding to the bolt hole 174. The tunnel reinforcement 105 is securely connected to the upper surface of the bridging portion 172 of the medial cross member 107 by means of a bolt 181 and a nut 182.

The tunnel reinforcement 105 is further provided with two circular openings 158 formed frontwardly and rearwardly of the bolt hole 157 for insertion of welding instruments to be used for the spot-welding of the flanges 173 of the medial cross member 107.

The lower open end of the tunnel reinforcement 105 is mated with an upper portion of the tunnel structure 111 under the conditions in which the bridging portion 172 of the medial cross member 107 extends through the recesses 156 of the tunnel reinforcement 105 in a direction transversely of the vehicle body. The front and rear ends of the tunnel reinforcement 105 are secured to the upper end of the bracket 112 and to the upper end of the upwardly and rearwardly inclined rising portion 113 formed rearwardly of the medial cross member 107, respectively, whereas the lower ends of opposed side walls of the tunnel reinforcement 105 are secured to respective opposite upper side edges of the tunnel structure 111. By doing so, two closed cross sections 150F and 150R partitioned by the medial cross member 107 are formed above the tunnel structure 111.

As is clear from the above, according to the present invention, since a dashboard lower cross member extending transversely of the vehicle body and having opposite ends rigidly secured to front side frames is securely mounted on a dashboard lower panel, the rigidity in the proximity of the dashboard lower panel is enhanced, thus reducing the number of parts and contributing to effective reinforcement.

Furthermore, the inside of a tunnel structure extending longitudinally of the vehicle body substantially at the center thereof is partitioned by extending an intermediate portion of the dashboard lower cross member towards the rear so that a closed cross section may be formed at an upper portion within the tunnel structure. This construction rigidifies the tunnel structure and can absorb an impact load produced, for example, in the event of a head-on collision. As a result, the impact load to be absorbed by both the front side frames can be reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile lower body structure comprising:
   a floor panel having a tunnel structure to extend longitudinally of a vehicle body at a location substantially centrally thereof;
   a dashboard lower panel having extending rearwardly therefrom a tunnel portion having an interior, said dashboard lower panel being secured to a front end of said floor panel;
   a pair of floor front side frames to extend longitudinally of the vehicle body at respective opposite sides thereof; and
   a dashboard lower cross member secured to a lower surface of said dashboard lower panel and to extend transversely of the vehicle body, said dashboard lower cross member having opposite lateral ends secured to respective said front side frames and an intermediate portion extending rearwardly along and through said interior of said tunnel portion of said dashboard lower panel at a position below an upper wall thereof, said intermediate portion partitioning said interior of said tunnel portion and defining a closed cross section extending longitudinally at an upper portion of said tunnel portion.

2. A structure as claimed in claim 1, wherein said dashboard lower panel further comprises a vertical partition wall, an inclined portion extending rearwardly downwardly from said vertical partition wall, and a floor portion extending horizontally rearwardly from said inclined portion, said tunnel portion extending rearwardly from said inclined portion at a location substantially centrally thereof and secured to a front end of said tunnel structure of said floor panel.

3. A structure as claimed in claim 2, wherein a rear end of said intermediate portion of said dashboard lower cross member is connected to a front portion of said tunnel structure of said floor panel.

4. A structure as claimed in claim 3, wherein an upper wall of said tunnel structure of said floor panel has a forwardly and upwardly extending flange, said tunnel portion is secured to a forward, upper end of said flange and said rear end of said intermediate portion of said dashboard lower cross member is secured to a rearward lower end of said flange.

5. A structure as claimed in claim 1, wherein said dashboard lower cross member comprises a vertical plate, a horizontal plate integral with said vertical plate, and a partition wall forming said intermediate portion and extending rearwardly from said horizontal plate.

6. A structure as claimed in claim 5, further comprising a U-shaped tunnel reinforcement having an open end thereof oriented downwardly, said tunnel reinforcement having a front end secured to a rear end of said tunnel portion and opposite lower edges secured to opposite upper side portions of said tunnel structure so that a closed cross section is formed above said tunnel structure.

7. A structure as claimed in claim 6, further comprising a medial cross member to extend transversely of the vehicle body on an upper surface of said floor panel, a rear end of said tunnel reinforcement being secured to said medial cross member.

8. A structure as claimed in claim 6, wherein said tunnel structure of said floor panel has an upper wall with a rearward portion thereof extending rearwardly and upwardly to an upper level substantially equal to that of an upper wall of said tunnel portion of said dashboard lower panel, and said tunnel reinforcement has a rear end secured to said upper level of said upper wall of said tunnel structure.

9. A structure as claimed in claim 5, wherein said partition wall includes a rear end connected to a front portion of said tunnel structure of said floor panel.

10. A structure as claimed in claim 9, wherein an upper wall of said tunnel structure of said floor panel has a forwardly and upwardly extending flange, said tunnel portion is secured to a forward, upper end of said flange, and said rear end of said partition wall is secured to a rearward, lower end of said flange.

* * * * *